(12) United States Patent
Merta et al.

(10) Patent No.: US 11,345,269 B2
(45) Date of Patent: May 31, 2022

(54) TRAILER AND ARRANGEMENT FOR DELIVERY OF PRODUCTS

(71) Applicant: Pickdelso Oy, Vantaa (FI)

(72) Inventors: Juha Merta, Vantaa (FI); Tapio Saviranta, Vantaa (FI)

(73) Assignee: Pickdelso Oy

( * ) Notice: Subject to any disclaimer, the term of this patent is extended or adjusted under 35 U.S.C. 154(b) by 284 days.

(21) Appl. No.: 16/329,772

(22) PCT Filed: Sep. 7, 2017

(86) PCT No.: PCT/EP2017/072473
§ 371 (c)(1),
(2) Date: Mar. 1, 2019

(87) PCT Pub. No.: WO2018/046603
PCT Pub. Date: Mar. 15, 2018

(65) Prior Publication Data
US 2020/0346572 A1    Nov. 5, 2020

(51) Int. Cl.
*B60P 3/00*    (2006.01)
*B60P 1/64*    (2006.01)
(Continued)

(52) U.S. Cl.
CPC ............ *B60P 3/007* (2013.01); *B60D 1/26* (2013.01); *B60P 1/649* (2013.01); *B60P 1/6481* (2013.01);
(Continued)

(58) Field of Classification Search
CPC ......... B60P 3/007; B60D 1/26; B60D 1/6481; B60D 1/649; B60H 1/00357; B60J 5/08; B62D 63/08
(Continued)

(56) References Cited

U.S. PATENT DOCUMENTS 1,360,412 A  * 11/1920 Kirchner ................... B60P 7/13
410/67
2,172,154 A  * 9/1939 Perin ......................... B60P 7/13
220/1.5
(Continued)

FOREIGN PATENT DOCUMENTS

DE         19716138       10/1998
DE       202004001562      1/2005
(Continued)

*Primary Examiner* — Hilary L Gutman
(74) *Attorney, Agent, or Firm* — Emerson Thomson Bennett; Roger D Emerson, Esq.

(57) ABSTRACT

An invention relates to picking, storing, and transporting of products. One objective is to reduce or eliminate manual work, or unnecessary process stages. The invention concerns a trailer (100) for a delivery of the products, wherein the trailer comprises an attachment point (101) for attaching the trailer to a road vehicle, a body with wheels, and a wall (104) attached to the body. The wall includes openings (105, 106) to a trunk that is limited by at least the body and the wall. The trailer comprises closures (109, 110) to cover and disclose the openings, and the trailer is configured to open a first closure (109) in response to a correct identifier. The trailer is further configured to receive a cart to a storing place so that, at the storing place (111), the cart holds a first repository (107) beside the first opening and a second repository (108) beside the second opening.

11 Claims, 7 Drawing Sheets

Figure 1:
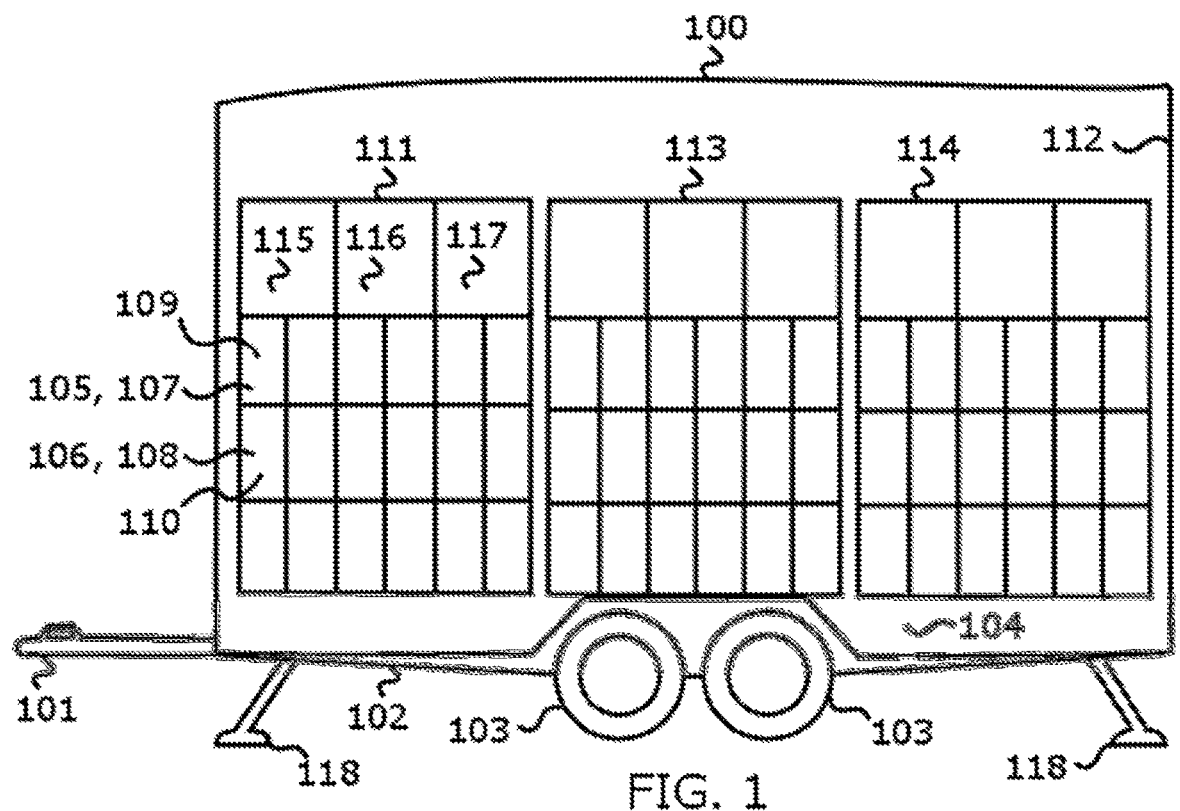

(51) Int. Cl.
*B60D 1/26* (2006.01)
*B62D 63/08* (2006.01)
*B60H 1/00* (2006.01)
*B60J 5/08* (2006.01)

(52) U.S. Cl.
CPC ............ *B60H 1/00357* (2013.01); *B60J 5/08* (2013.01); *B62D 63/08* (2013.01)

(58) Field of Classification Search
USPC .......... 296/24.36, 24.4, 24.41, 24.44, 24.45; 211/126.15
See application file for complete search history.

(56) References Cited

U.S. PATENT DOCUMENTS

| | | | | |
|---|---|---|---|---|
| 5,709,252 | A * | 1/1998 | Princiotta | B60P 3/055 108/55.3 |
| 6,085,825 | A * | 7/2000 | Swink | B60J 5/08 160/133 |
| 7,407,238 | B2 | 8/2008 | Fitzgerald | |
| 9,127,872 | B1 * | 9/2015 | Chainey | B60P 7/13 |
| 9,256,852 | B1 * | 2/2016 | Myllymaki | B60P 3/007 |
| 9,511,960 | B1 * | 12/2016 | Bradford | B60J 5/08 |
| 9,713,977 | B1 * | 7/2017 | Neal | B60P 1/4442 |
| 10,783,599 | B1 * | 9/2020 | Hartman | G07C 9/00309 |
| 2004/0067129 | A1 * | 4/2004 | Krawczyk | G06Q 10/083 414/801 |
| 2005/0091988 | A1 * | 5/2005 | Stewart | B60P 3/0257 62/3.1 |
| 2005/0275234 | A1 | 12/2005 | Ottenthal | |
| 2006/0216966 | A1 | 9/2006 | Selek | |
| 2012/0031686 | A1 * | 2/2012 | Ferrigni | B60P 3/20 180/2.2 |
| 2014/0354001 | A1 * | 12/2014 | Hanley | B60R 11/00 296/24.44 |
| 2017/0217358 | A1 * | 8/2017 | Paunov | B60R 5/003 |
| 2017/0259648 | A1 * | 9/2017 | Putcha | F25D 29/003 |
| 2018/0105092 | A1 * | 4/2018 | Putcha | B60P 1/36 |
| 2018/0118078 | A1 * | 5/2018 | Alkhaldi | B60P 3/0257 |
| 2018/0273072 | A1 * | 9/2018 | Saviranta | B62B 3/146 |
| 2018/0368352 | A1 * | 12/2018 | Smith | A01K 1/0064 |
| 2019/0210674 | A1 * | 7/2019 | Deal | B65D 88/542 |
| 2020/0283229 | A1 * | 9/2020 | Edwards | B25J 11/008 |
| 2020/0385207 | A1 * | 12/2020 | Godwin | B60P 1/6481 |

FOREIGN PATENT DOCUMENTS

| | | | | |
|---|---|---|---|---|
| DE | 202006003054 | | 6/2006 | |
| DE | 102012023603 | | 6/2014 | |
| DE | 102014116006 | | 5/2016 | |
| EP | 1155913 | | 11/2001 | |
| EP | 3228496 | A2 * | 10/2017 | ............ B60P 3/007 |
| EP | 3566900 | A1 * | 11/2019 | ........... B60R 25/255 |
| EP | 3626531 | A1 * | 3/2020 | ............ G06Q 10/08 |
| WO | 2005075779 | | 8/2005 | |
| WO | WO-2014111483 | A1 * | 7/2014 | ......... G06Q 10/0832 |

* cited by examiner

TRAILER AND ARRANGEMENT FOR DELIVERY OF PRODUCTS

TECHNICAL FIELD

Area of technology: an invention relates to picking, storing, transporting, and delivery of products; the invention especially relates to manners to reduce or eliminate manual work or process stages.

BACKGROUND

Products can be ordered from internet and later on the products are delivered, for example, to the homes of the subscribers. Products refer in this description, for example, grocery products, or some other products bought in a web shop, or laundry. The delivery service includes at least an ordering stage, a picking stage, and a delivery stage. A collector, i.e. the person who performs the picking stage, collects the products to totes. A plastic bag and a paper bag are typical totes. The totes are placed in boxes, and the collector may move the boxes by a cart during the picking stage. In the delivery stage the products are transported to the customers. Alternatively, the products can be delivered by using in an automaton equipped with lockers, after which the customers fetch their products from the lockers (this service is termed click & collect).

Various packet and parcel automatons have been developed for delivery of products. Some of the automatons are termed "grocery lockers" because they are intended for delivering grocery products to customers. Correspondingly, some automatons are made for laundry. Each locker may include tens of products packed in at least one tote. In many present delivery services a collector picks products into totes and, after the picking stage, the totes are lifted by hands into the lockers of the automaton. This task, i.e. lifting the totes can be eliminated, for example, by using one the following systems.

DE19716138 describes a system in which lockers are arranged in a cart, or a plurality of carts, and the locker doors form a wall so that the lockers are reachable through the locker doors.

U.S. Pat. No. 7,407,238 describes a system comprising a cart with shelves and a wall with doors so that the shelves of the cart are reachable through the doors.

The systems described in DE1971613 and US740723 has such drawback that the carts are not intended for picking products into totes or containers, which causes an additional need to move the totes or containers.

The applicant's prior patent application, PCT/FI2016/050335 describes a system that reduces the needs to move the totes or containers, because a cart to be used in the automaton is also intended for picking products directly into totes.

DE102012023603 describes a mobile safe-deposit box system for delivering, for example, odorous fresh vegetables. DE202004001562 describes a mobile locker system, particularly for accommodating utility objects used on beaches, such as air mattresses, parasols, or similar. EP1155913 describes a storage system comprises a wheeled structure carrying a plurality of closable compartments, and a lock arrangement.

A drawback to be solved in the present application is related to the delivery stage of products. In more detail, when a delivery site is located far from the picking site, the products must be transported to the delivery site by a delivery vehicle, such as a van or truck. In the system described in PCT/FI20161050335 the carts e from the trunk of the delivery vehicle to an automaton. The unloading of the cats may be difficult, if a loading bridge is missing from the proximity of the automaton. If the delivery vehicle is equipped with a tail lift, the carts can be moved by it, but use of the tail lift requires space at the delivery site and may take too much time.

Another drawback is that the prior art automatons are dependent on mains electric power (also known as utility power or wall power) at the delivery site. In addition, it may be difficult to estimate which delivery site the customers would prefer and which capacity (in number of totes) the automatons should have. Therefore, one drawback in the prior at automaton networks is the lack of scalability of the automaton networks.

SUMMARY

An objective of the invention is to solve at least some of the above-mentioned drawbacks. The invention is especially intended for a business in which products are delivered from a picking site to a number of delivery sites.

The invention concerns a trailer for a delivery of products, the trailer comprising an attachment point for attaching the trailer to a road vehicle, a body with wheels, a wall attached to the body, the wall including openings to a bunk that is limited by at least the body and the wall, and closures to cover and disclose the openings, and the trailer is configured to open a first closure in response to a correct identifier, and the trailer is configured for the delivery so that a first repository in the bunk is reachable only through a first opening and a second repository in the bunk is reachable only through a second opening, and the trailer is configured to receive a cut to a storing place so that, at the storing place, the cart holds the first repository beside the first opening and the second repository beside the second opening.

In one embodiment the trailer is configured to receive a frame into the bunk so that the frame holds the first repository beside the first opening and the second repository beside the second opening.

BRIE DESCRIPTION OF THE DRAWINGS

For a more complete understanding of examples and embodiments of the present invention, reference is now made to the following descriptions taken in connection with the accompanying drawings.

Figure 2:
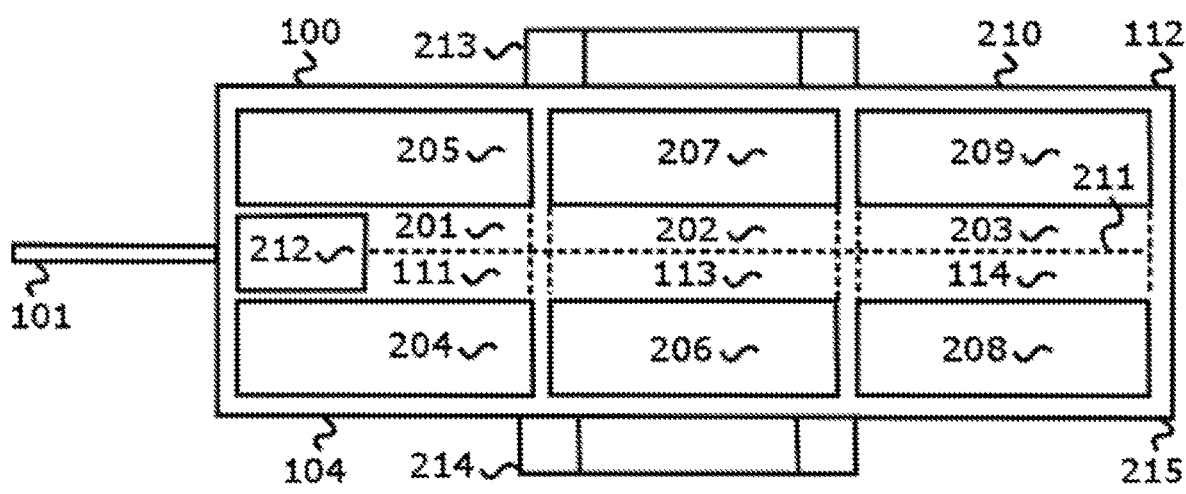
Figure 3:
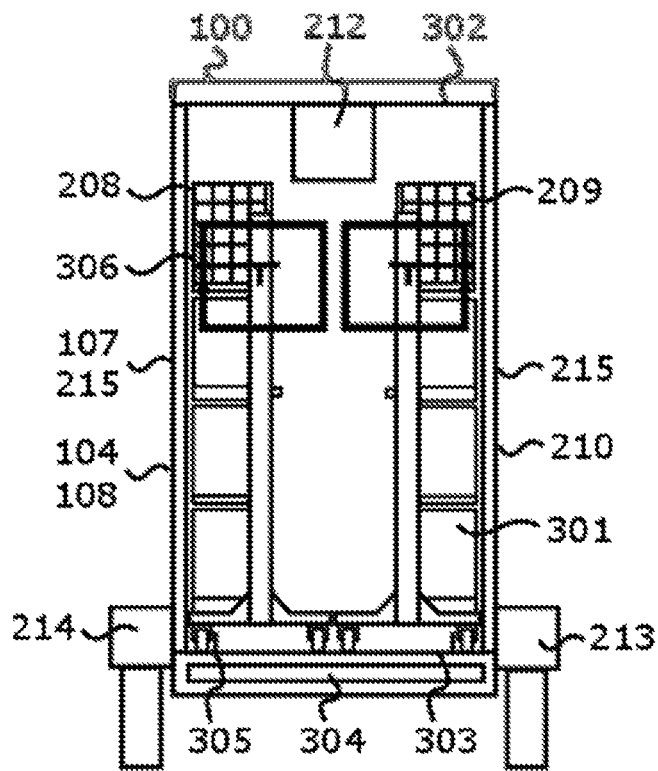
Figure 4A:
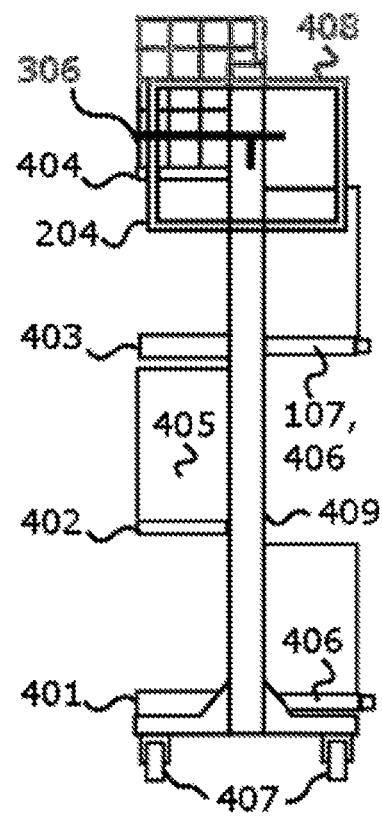
Figure 4B:
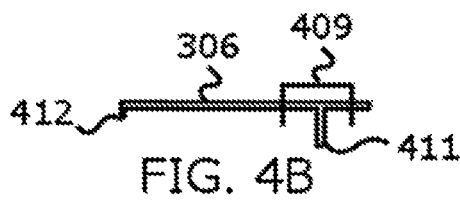
Figure 4C:
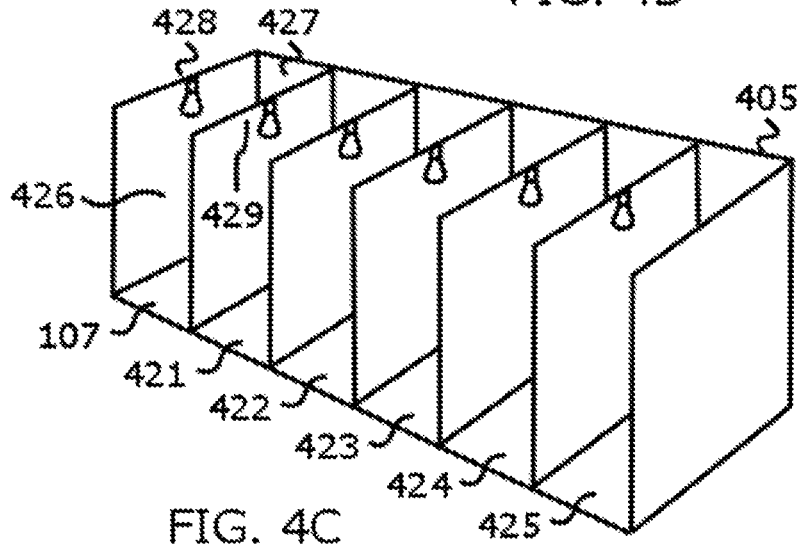
Figure 5:
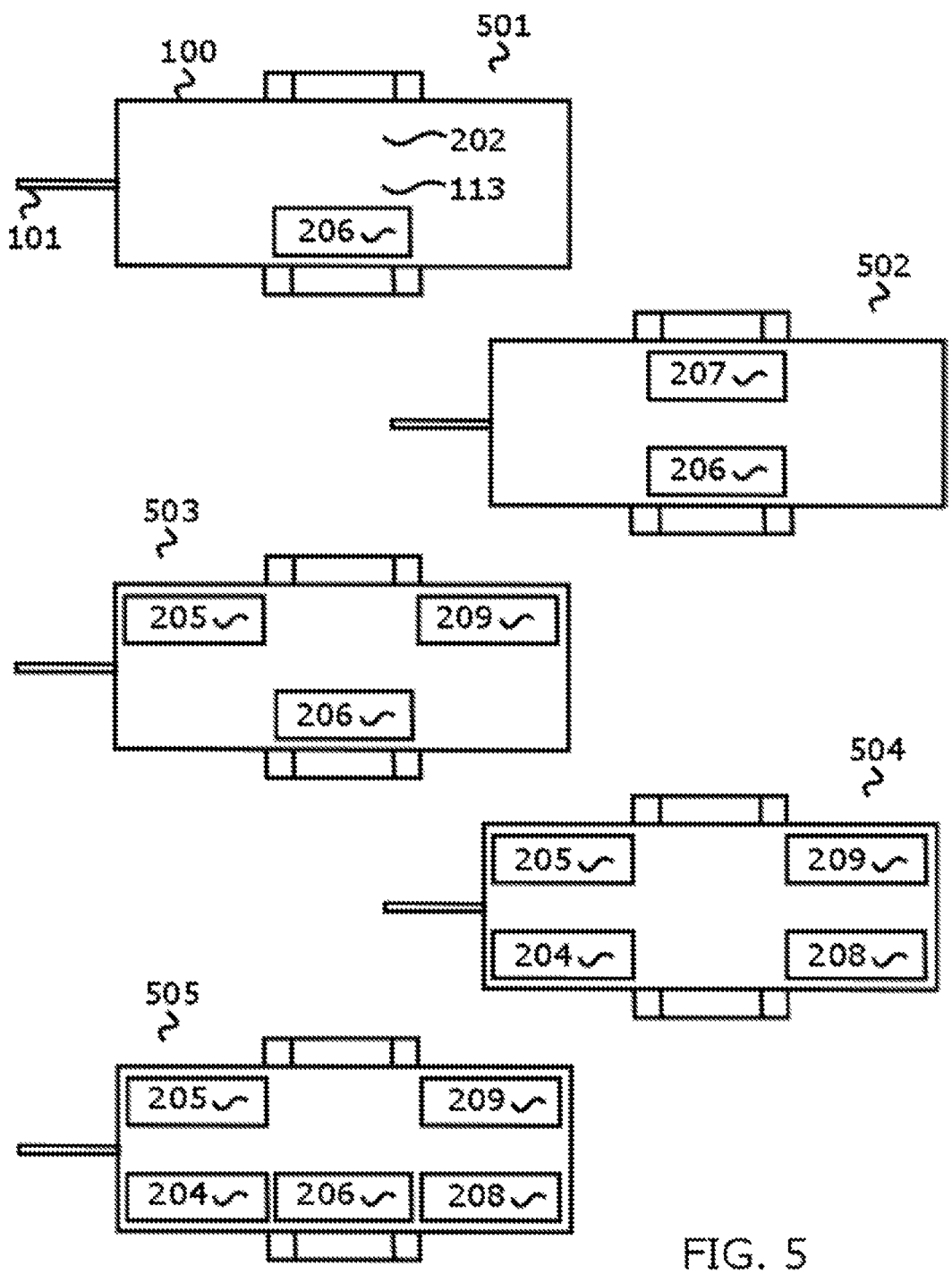
Figure 6:
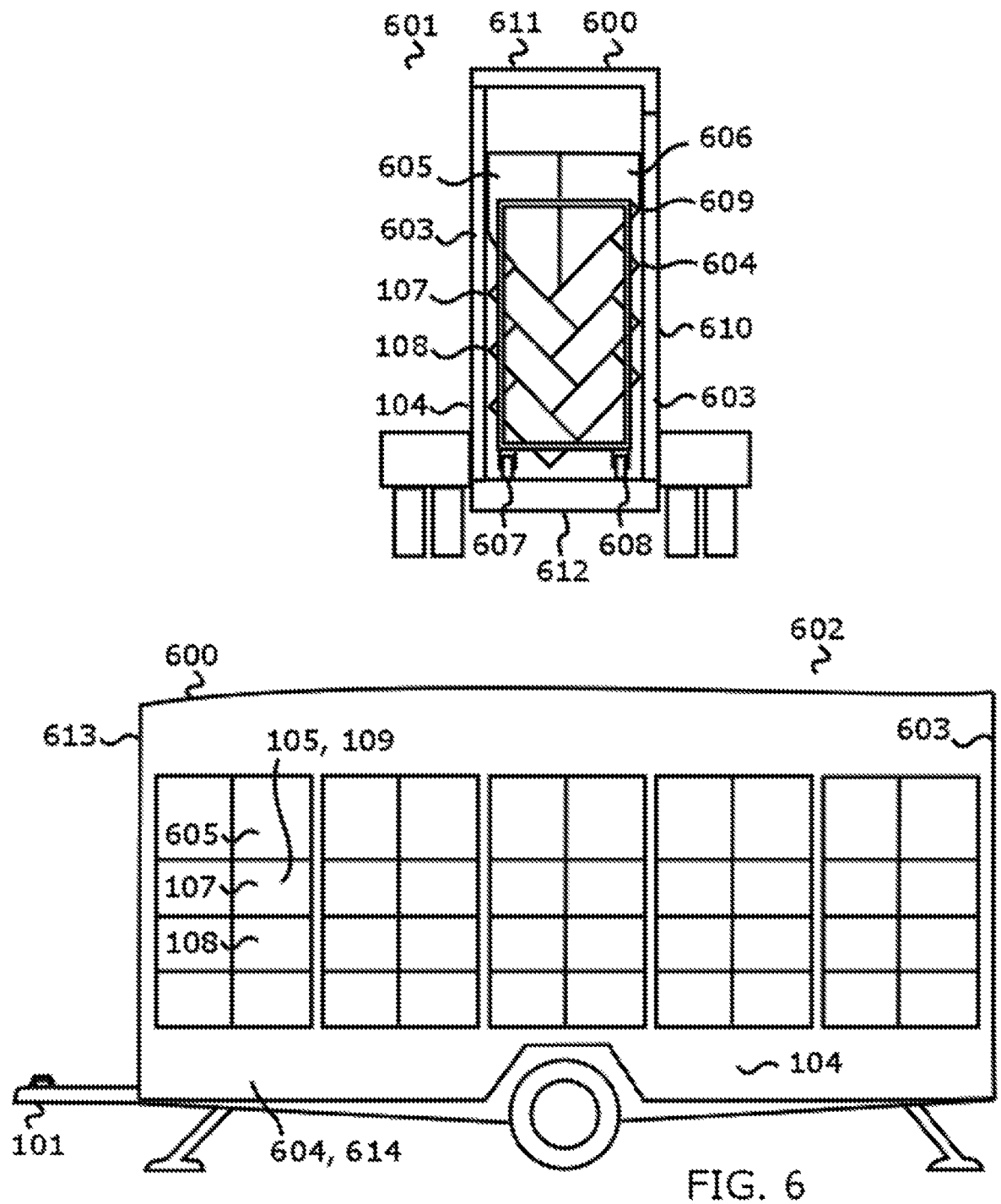
Figure 7A:
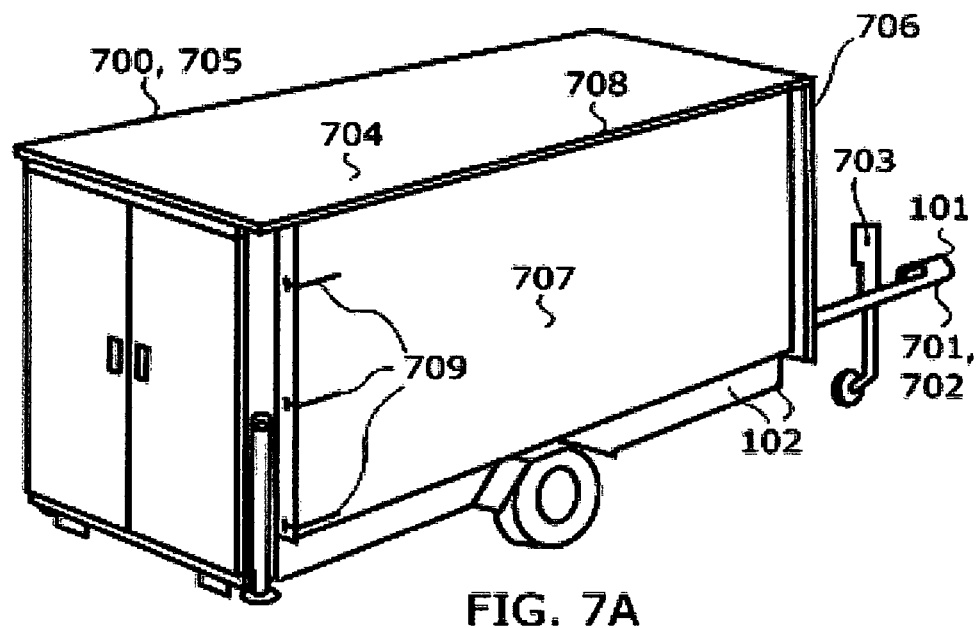
Figure 7B:
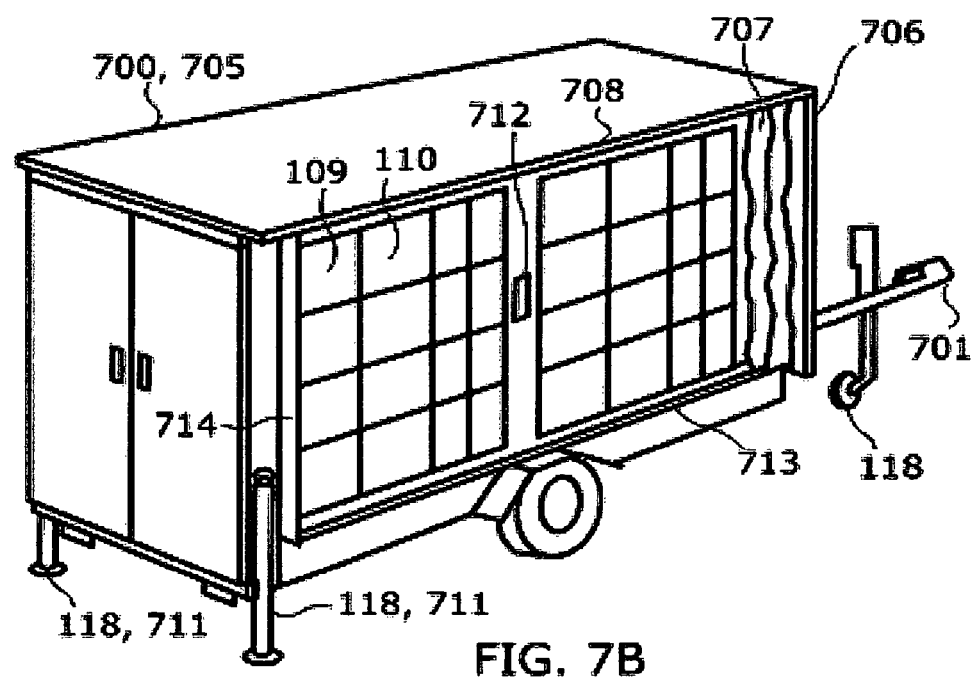
Figure 8:
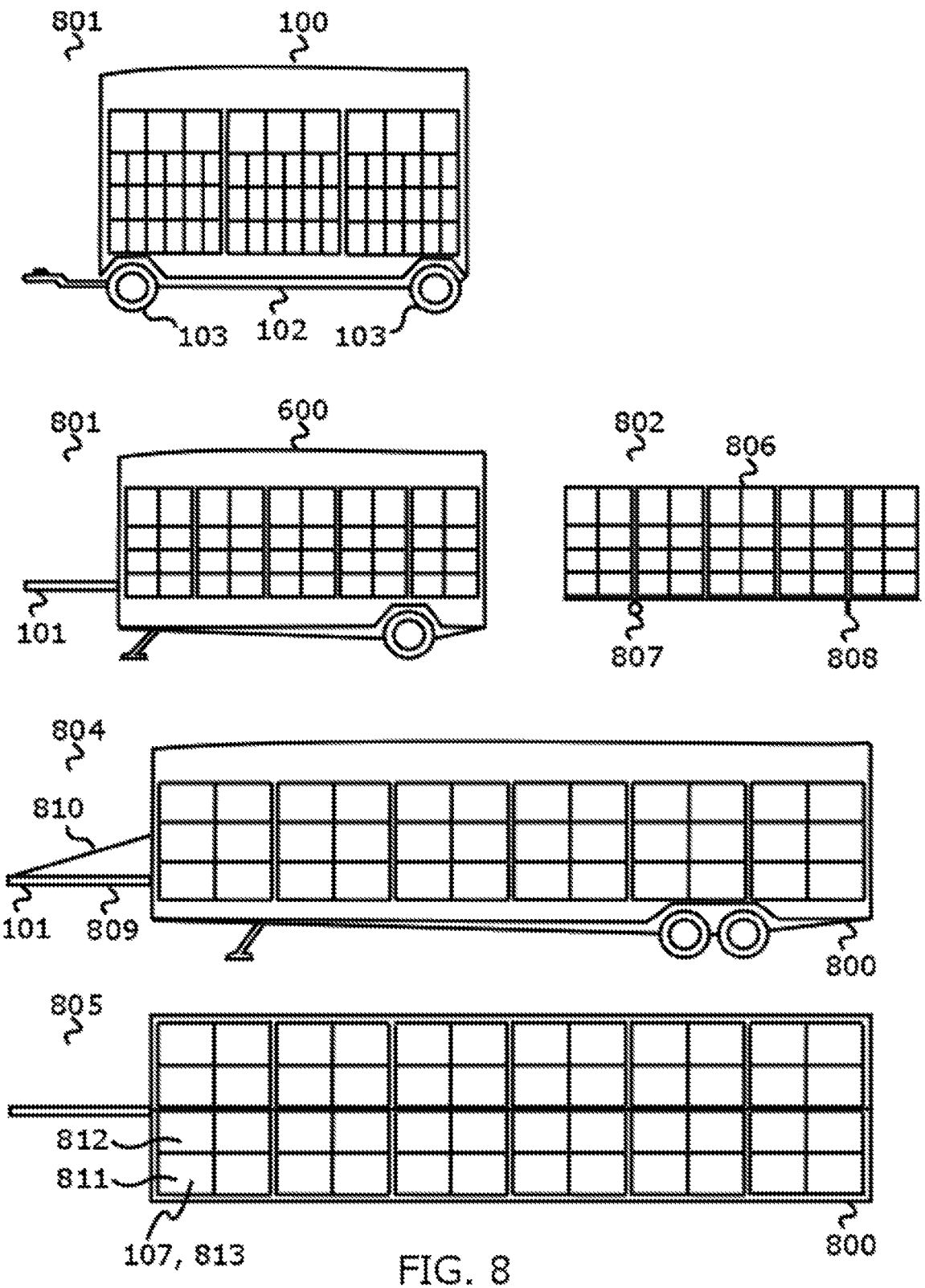
Figure 9:
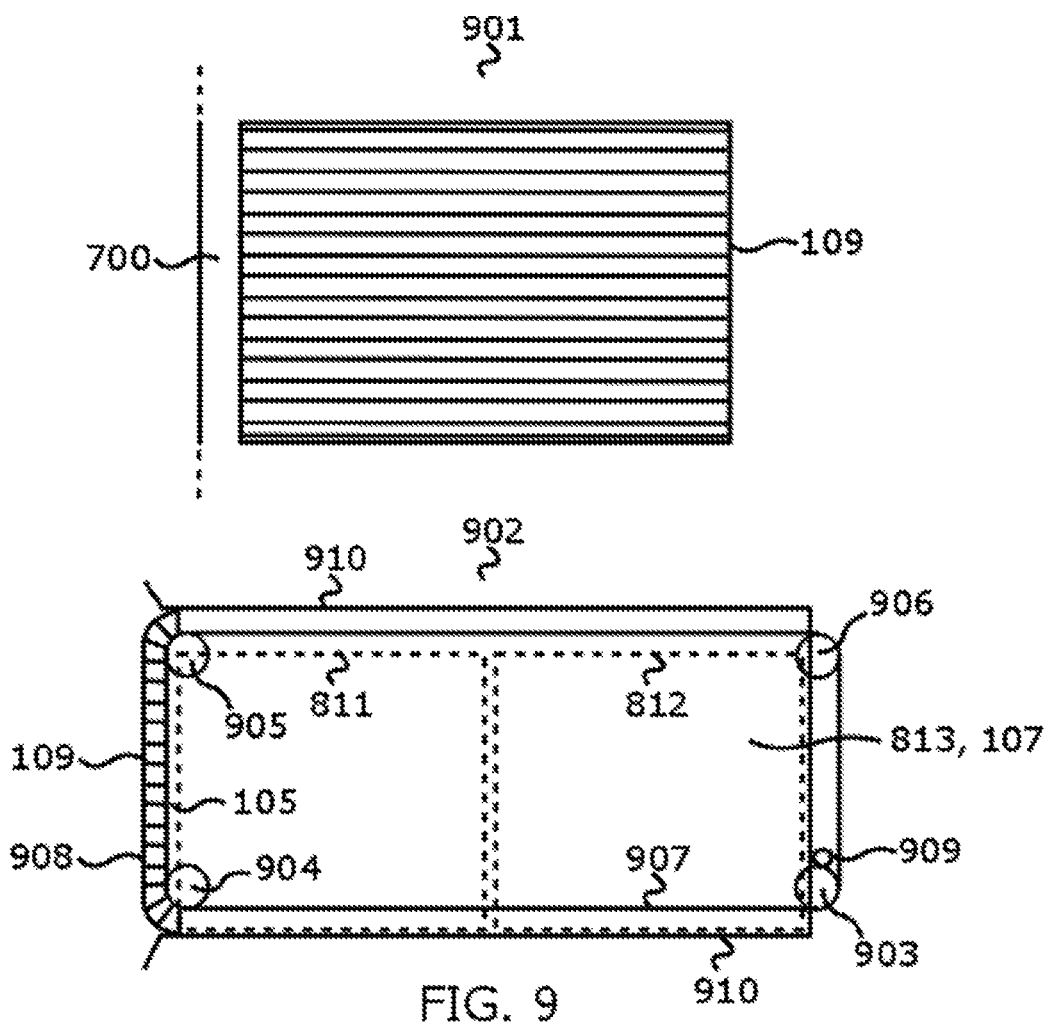
Figure 10:
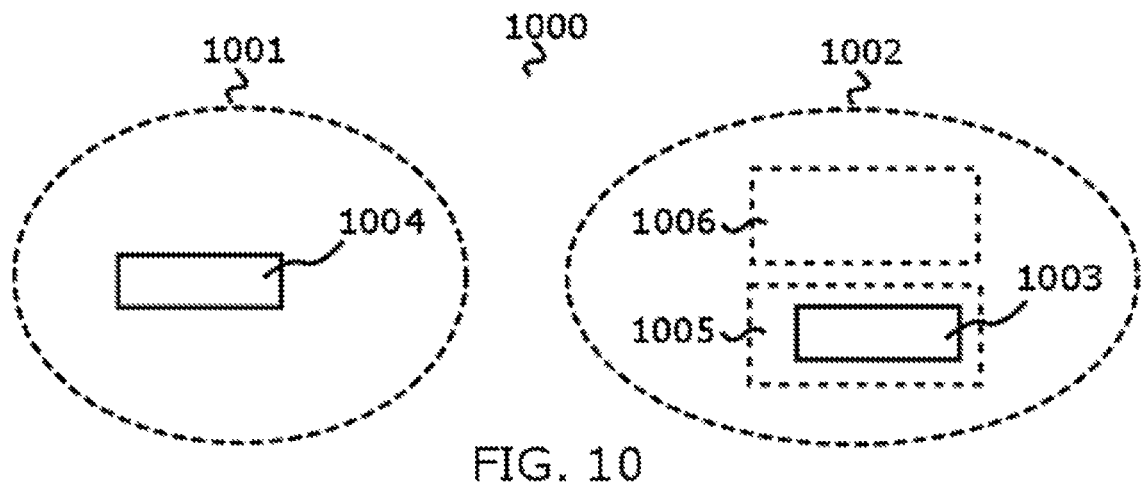

FIG. 1 shows an example of a trailer.
FIG. 2 shows the trailer from a bird's perspective.
FIG. 3 shows the trailer from the back side.
FIG. 4A shows a cart in picking use.
FIG. 4B shows a fastener for the cart.
FIG. 4C shows a repository set for the cart.
FIG. 5 illustrates a balanced loading of the trailer.
FIG. 6 shows a second trailer example.
FIG. 7A shows a movable locker system.
FIG. 7B shows the movable locker system in use.
FIG. 8 shows various trailer embodiments.
FIG. 9 shows an automatically closable closure for a repository.
FIG. 10 shows an arrangement for a delivery of products.

DETAILED DESCRIPTION OF THE INVENTION

It is appreciated that the following embodiments are exemplary. Although the specification may refer to "one" embodiment, the reference is not necessarily made to the same embodiment(s), or the feature in question may apply to multiple embodiments.

FIG. 1 shows an example of a trailer 100 for totes, wherein trailer 100 is viewed from its long side. Trailer 100 can be considered as a movable automaton that is intended for storing and delivering of products in totes. The products are, for example, grocery products, electronic products, clothes etc. A tote is, for example, a shopping bag, a laundry bag, or a (postal) parcel or package. Trailer 100 comprises an attachment point 101 for attaching trailer 100 to a road vehicle, such as a pick-up, an off-road vehicle, or a crossover car. Attachment point 101 is, for example, a part into which the coupling hook of the vehicle fits. Trailer 100 comprises a body 102 having at least two wheels 103. Attachment point 101 may be coupled to body 102 with a beam as in the figure.

Trailer 100 comprises a wall 104 attached to body 102, and openings to repositories that are intended for storing totes. A first opening 105 and a second opening 106 are located in wall 104 so that a first repository 107 is reachable only through first opening 105 and a second repository 108 is reachable only through second opening 106 when a cart containing first repository 107 and second repository 108 is received into trailer 100. When using the same cart in a delivery of the products unnecessary moving of the products can be avoided. Body 102 can be understood as a steel frame or a chassis that is generally used in trailers. Wall 104 can be understood as a part of a coachwork that is (permanently) attached to body 102. A steel plate, an aluminium plate, or a weatherproof plastic is an appropriate surface material for wall 104.

Wall 104 includes closures, such as a first closure 109 and a second closure 110, to cover and disclose the openings. A basic example of closure is a hinged hatch that can be termed a locker door. The closures are openable with a code (such as a pin number) so that when a customer inputs or provides the correct code, at least one locker door will open and the customer can take his/hers tote/totes out of trailer 100. Because the repositories are intended for one tote, the customer's purchases may require a number of repositories.

In one embodiment all closures of the repositories will open when a customer provides a correct identifier (such as a pin number). The correct identifier can be provided wirelessly, for example, by using Near Field Communication (NFC) techniques. In another embodiment the closures will open one by one so that the next closure, such as second closure 110, will open when a previously opened closure is closed.

Each storing place inside trailer 100 can receive one cart. Trailer 100 is configured to receive the cart to a storing place 111 beside wall 104 so first repository 107 is reachable through first opening 105 and second repository 108 is reachable through second opening 106. Trailer 100 comprises a cart entry 112 for moving a cart on its wheels into trailer 100 and out of trailer 100. Cart entry 112 is not visible in the figure but it is located on a back end of trailer 100. After a picking stage the products picked in totes are moved in carts through cart entry 112 into trailer 100.

In addition to storing place 111, there are two other storing places 113, 114 for carts on same side of trailer 100. Therefore, wall 104 includes in this example altogether 63 openings, such as first opening 105 and second opening 106, on its long side and as many closures, and repositories so that the openings, the closures, and the repositories are divided between three carts, each of the three carts having twenty-one repositories. Eighteen of those twenty-one repositories are especially intended for shopping bags, but the three repositories locating the uppermost in the cart may include products in a package. A toilet paper package is an example of said products. Closures 115-117 cover accesses to the three uppermost repositories.

After the picking state trailer 100 includes at least one cart that will be transported to a delivery site and parked there. In more detail, trailer 100 is detached from the road vehicle and left, for example, on a parking lot for a predetermined period of time that is termed a "delivery time window". One benefit of trailer 100 is it operates as an unmanned delivery point. When the delivery time window is ended, and the all totes are expected to be fetched (by customers), trailer 100 (and the carts inside it) will be transported back to the same picking site, or some other picking site.

In this example closures 115-117 and the rest of the closures are in their closed position, trailer 100 is parked, and customers can fetch their totes from trailer 100. Trailer 100 is configured to open by using a computer unit and an electric lock a closure, such as first closure 109, in response to providing a correct (visual or electrical) identifier.

Trailer 100 has altogether four legs 113 on which trailer rests when parked. Legs 118 are intended to be used at the picking site and at each delivery site. The legs are lifted up during trailer transportation. By using legs 118, the trailer floor can be set on a horizontal plane even if the parking plot is bumpy or tilted to some direction.

FIG. 2 shows a cross-section of trailer 100, wherein trailer 100 is viewed from a bird's perspective. Trailer 100 includes altogether six storing places 111, 113, 114, 201-203 for the carts, three storing places on each long side of trailer 100. The all storing places are in use, because six cats 204-209 are received in said storing places. For example, cut 204 is received in staring place 111.

Storing place 111 must have some attachment arrangement to attach cart 204 so that the transportation does not cause any damage in the trunk of trailer 100. The attachment arrangement may comprise attachment points on the trunk and cargo straps by which cart 204 is tied to the attachment points to hold cart 204 on its storing place.

Alternatively, the attachment arrangement may comprise a steel pipe that can be locked to wall 104 and a corresponding wall 210 on the other long side of trailer 100 so that cart 204 can neither move in the trunk towards the front end of trailer 100 nor towards the back end of trailer 100. Said steel pipe may include a book type of part for holding cart 204 and preventing cart 204 to tilt towards cart 205.

As wall 104, also wall 210 has altogether 63 closures to cover and disclose as many openings to the repositories, wherein the repositories are located in carts 205, 207, 209 so that each of the carts includes twenty-one repositories. Open space 211 in the trunk continues from the back end of trailer 100 to its front end and is useful for circulating air inside trailer 100. A cooling apparatus 212 at the front end cools the air and circulates it to maintain a refrigerator temperature in the trunk. If the climate is cold, also a heating apparatus is needed to maintain an appropriate temperature in the trunk.

The following cart and trailer measurements are examples. Cart 204 is 55 cm width on the level of the cart wheels to keep cut 204 in balance when moving it. Cart 204 is 35 cm width over the cat wheels, wherein the width of 35 cm is the same as the width of a tote. Open space 211 between carts is 40 cm width. Wall 104 and wall 210 are both 5 cm thick because of a thermal insulation layer. Therefore, the width of the trunk from the outer surface of wall 104 to outer surface of wall 210 is 120 cm. Because the wheels extend outside of the trailer body, the width of trailer 100 from a mudguard 213 to another mudguard 214 on the opposite side of trailer 100 is about 160 cm. Each cart is 120 cm long and the carts are situated at two queues so that carts 204, 206, and 208 form one queue and carts 205, 207, and 209 form another queue.

Each cart queue includes three carts and is thus 360 cm long. The back end of trailer 100 is closed with a 110 cm width pair of doors 215. Pair of doors 213, as well as the front end of trailer, is 5 cm thick because of the thermal insulation layer. The beam of trailer 100 is 80 cm long. Therefore, the length of trailer 100 from the top of the beam to pair of doors 215 is about 450 cm, and trailer 100 can be parked to a parking lot that is 5 m long and 2.5 m width.

FIG. 3 shows trailer 100 from the back side. Pair of doors 215 is in the open position and thus carts 208, 209, which are placed into the trunk of trailer 100, are visible. Trailer 100 comprises repositories on its both walls (wall 104, wall 210). For example, repository 301 is reachable through wall 210 when cart 209 is received into trailer 100. Loading of trailer 100 can be performed at the picking site by using a loading platform and a light loading bridge between trailer 100 and the loading platform. The loading bridge may be a hinged aluminium plate that is light enough to be used by hands.

The following cart and trailer measurements are examples. The height of carts 208, 209 is 170 cm. The height of the trunk is 200 cm and cooling apparatus 212 is located between two carts at the front end of trailer 100. Therefore, the trunk is so large that a delivery vehicle driver can enter into it when loading or unloading trailer 100. A ceiling 302 and a floor 303 in trailer 100 include the thermal insulation layer. Floor 303 further includes a space for a battery 304. Cooling apparatus 212 can function with battery 304 and therefore trailer 100 is independent from mains electricity, at least during the transportation from a picking site to a delivery site.

In one embodiment trailer 100 is independent from mains electric power also at the delivery site by utilizing battery 304. The closures of repositories are configured to operate on battery 304. When trailer 100 is transported from the delivery site back to the picking site it is connected to mains electric power, after which cooling apparatus 212 functions with the mains eclectic power and battery 304 is recharged.

In one embodiment trailer 100 comprises the following attachment arrangement to hold cart 208 on its storing place 114. The attachment arrangement includes a mechanical guide 305 and a fastener 306, and mechanical guide 305 is configured to touch cart wheels to keep cart 208 against wall 104 and fastener 306 is configured to lock cart 208 to ceiling 302 so that cart 208 stays on its storing place 114.

In one embodiment fastener 306 is a barrel bolt by which cart 208 can be attached to wall 104. Wall 104 includes a hole for the barrel bolt. When pushed into the hole and then turned 90 degrees the barrel bolt locks cart 208 to wall 104 and prevents cart 208 from falling towards cart 209 during transportation of trailer 100. Mechanical guide 305 continues from cart entry 112 to the front end of trailer 100 and wall 104 includes holes for barrel bolts so that carts 204, 206 can be held on theirs storing places 111 and 113. Carts 205, 207, 209 on the opposite side of the trunk can be held on theirs storing places 201-203 by using a corresponding guide and barrel bolts.

FIG. 4A shows cart 209 in picking use, wherein cart 209 is viewed from its short side. Cart 209 also represents the other corresponding carts, i.e. carts 204-208. Any of carts 204-209 can be placed to any of storing places 111, 113, 114, 201-203.

Cart 209 comprises four shelves 401-404 of which the lowest shelf 401 and the third shelf 403, counting from below, are movable shelves and the other two shelves 402, 404 are fixed shelves. First repository 107 is located on movable shelf 403. The uppermost shelf, i.e. shelf 404, includes steel mesh on three sides so that the both short sides have the steel mesh. Dividing walls divide shelf 404 into three repositories which are located beside closures 115-117 shown in FIG. 1. The dividing walls are made of steel mesh or transparent plastic plates, for example. Each of shelves 401-403 includes a repository set for six totes. Each repository in a repository set 405 is configured to support a tote. Thus, during the picking stage, the mouth of the tote is continuously at least partly disclosed to receive the products into the tote.

Each movable shelf comprises a displacer 406 which is, for example, a pair of a drawer slides or a pair of slide rails. A telescopic drawer may include three nested slides. Cart 209 is configured for picking so that displacers 406 have an open position and they remain in the open position when cart 209 is moved during the picking. When in an open position displacer 406 and moveable shelf 403 reveal repository set 405 of fixed shelf 402 so that products can be picked in the repositories of repository set 405.

At least two of the cart wheels 407 can turn in order to make cart 209 guidable. Cut 209 includes fixed handles 408 for pushing and guiding the cart. A durable material, such a steel, is an appropriate material for the body of cart 209. The cart body includes U profile 409 and a corresponding U profile at the opposite end of cart 209.

It should be noticed that in FIG. 3 the all carts, including cart 209, ae narrowed. In other words, cart 209 is changed from the picking use to the delivery use so that moveable shelves 401, 403 are pushed to their opposite position in which they are located beside wall 104.

FIG. 4B shows fastener 306 for cat 209, wherein fastener 306 is viewed from a bird's perspective. Fastener 306 is about 40 cm long barrel bolt that penetrates U profile 409 in two points. In more detail, U profile 409 includes two holes so that fastener 306 can be moved along a line defined by said two holes. Fastener 306 includes a handle 411 for moving the fastener along the line and a protrusion 412 for locking cart 209 to a wall of trailer 100. Handle 411 is in a horizontal orientation because in this orientation protrusion 412 can be pushed inside the wall. Then handle 411 can be tuned to a vertical orientation to lock cart 204 (in FIG. 3 protrusion 412 is located inside wall 104 and cart 209 is locked and ready for the transportation).

FIG. 4C shows repository set 405 intended for carts 204-209. Repository set 405 includes first repository 107 and five other similar repositories 421-425.

First repository 107 includes a side opening 426 and an upper opening 427. Upper opening 427 opens upwards relative to the bottom of first repository 107. Side opening 426 means that one short side is missing from the repository. A tote (and the products placed in the tote) can be taken through side opening 426 out of the repository.

First repository 107 comprises holders 428, 429 for holding at least one handle of the tote so that holder 428 is located on the upper edge of a long side of the repository and holder 429 is located on the upper edge of the opposite long side (holder 429 is not visible in the figure). For example, carabiners can be used as holders 428, 429. In more detail, a holder 428, 429 includes a carabiner and a band attached to the carabiner, and a staple for attaching the band into a hole of the repository. Before the picking stage a tote, which has handles on its short sides, is placed into the repository and one of the handles is attached with holders 428, 429 to the repository. Holders 428, 429 support the tote and keep its mouth at least partly open for picking of products so that a collector can put the products into the tote through upper opening 427. If the tote has handles on its long sides, holder 428 is attached to one handle and holder 429 is attached to the other handle.

In one embodiment a system unit for picking and storing of products is one tote. The small unit size increases the statistical storage capacity approximately 100% compared to the known systems in which the system unit is larger, for example, 701.

FIG. 5 illustrates a balanced loading of trailer 100 from a bird's perspective. Correspondingly, other trailers mentioned later in this description can be balanced. Trailer 100 can receive from one to six carts so that a weight at attachment point 101 stays for safety reasons within a predetermined range.

In the first view 501 a single cart 206, is placed at the middle of (trailer) body 102 where the cart can be placed either on storing place 113 or 202.

In the second view 502 two carts 206, 207 are placed at the middle of trailer body (alternatively they could be placed on the opposite ends of body 102).

In the third view 503 two carts 204, 205 are placed on the opposite ends of trailer body 102 and one cart 206 is placed at the middle of body 102.

In the fourth view 504 two carts 204, 205 are placed on one end of trailer body 102 and two carts 206, 207 are placed on the opposite end of body 102.

In the fifth view 505 the placing of carts is the same as in the fourth view 504, except that the fifth cart, i.e. cart 208, is placed at the middle of body 102.

FIG. 6 includes an example of trailer 600 that is used with picking carts.

The first view 601 shows trailer 600 from the back. Pair of doors 603 is in the open position and thus a cart 604 is visible in the trunk of trailer 600. First repository 107 is tilted to keep its content inside of it. Cart 604 includes repositories which are tilted to at 45 degrees angle in relation to the horizontal plane. The repositories are made of perforated steel plate, for example. When washing them, the wash water drips through the perforation out of the repositories. The uppermost repositories 605, 606 are intended for light products and they are larger than the repositories locating under them. The most repositories, such as first repository 107 and second repository 108, are intended for shopping bags. Cart 604 has wheels 607, 608 and a handle pipe 609 for moving and guiding cart 604. Cart 604 extends from wall 104 to a corresponding wall 610.

The both walls (wall 104, wall 610) include openings for the repositories. The trunk of trailer 600 has a space for a cooling apparatus in the proximity of the ceiling 611. The floor 612 of the trunk is thick enough to enclose a battery inside it.

The following cart and trailer measurements are examples. The height of cart 604 is 150 cm, the width is 60 cm, and the length is 80 cm. The height of the trunk is 160 cm, the width is 61 cm, and the length is 401 cm. The all five carts are kept in the trunk during transportation, because the carts fill the trunk so that they cannot move horizontally when pair of doors 603 is closed. A benefit of this embodiment is that no separated attachment arrangement is needed. Because the trunk is low (160 cm) and narrow (61 cm), a person loading cart 604 can utilize about 350 cm long rod with a book at one of its end so that the person grips handle pipe 609 with the hook and uses the rod to push cart 604 into trailer 600. The rod with the hook can be utilized also when unloading trailer 600.

The second view 602 shows trailer 600 from its long side. Cart 604 is pushed against a front wall 613 and against wall 104 and therefore cart 604 is located in a storing place 614. For example, first repository 107 in the trunk is reachable through first opening 105 after providing a correct code or another identifier, such as a linear barcode or as a matrix barcode. The correct identifier opens first closure 109 and rants an access to first repository 107. The lower edge of the uppermost repository 605 is located (in this example) at the height of 160 cm from the ground.

As cat 204, also cart 604 may be parked for a time at a picking site. A benefit related to the parking is that cart 204, 604 can be used as storage for totes. In more detail, when products ae picked into the totes, and the picking stage ends, cart 204, 604 is moved into trailer 100, 600. When a driver arrives to the picking site, he/she just attaches trailer 100, 600 to the road vehicle and transports it to a delivery site. In other words, there is no need to move the carts and the products after the picking stage into a chilled room and later on from the chilled room into a delivery vehicle.

FIG. 7A shows trailer 700 that can be used as a movable locker system. Trailer 700 comprises body 102 with wheels, trailer lights, a trailer pole, and attachment point 101. A trailer leg is attached to the trailer pole and it includes a wheel. Attachment point 101 comprises a lock for ball hitch and a coupling switch 701.

In one embodiment trader 700 comprises a parking arrangement described in detail in AU2018100432. The parking arrangement includes such embodiment that a motion sensor detects whether trailer 700 is moving and if trailer 700 is moving, the motion sensor (or a signal sent by it) prevents decoupling of trailer 700. Generally speaking, the operation of an electronic motion detector is based on, for example, an optical, a microwave, or an acoustic detection. In one embodiment the motion sensor is an optical sensor that is attached to a trailer pole and directed towards the ground.

The parking arrangement comprises a lock opener 702 for opening a lock affecting attachment point 101 and a leg actuator 703 for moving a trailer leg such that attachment point 101 detaches from a road vehicle (not shown). Leg actuator 703 is able to lift attachment point 101 upwards from the ground.

The parking arrangement further comprises an electrical system (such as a battery) independent from a road vehicle, a receiver for receiving a decoupling command (from the road vehicle), and a control unit comprising a processor and a memory. The control unit is configured to receive the decoupling command through a receiver and then command lock opener 702 to open the lock affecting attachment point 101. The control unit is also configured to command leg actuator 703 to detach trailer 700 from the road vehicle (to which it is coupled).

For example, a tablet with a WiFi modem can be used as a platform for a trailer control application by which a road vehicle can give a decoupling command to decouple trailer 700 from the road vehicle. Then also trailer 700 includes a WiFi modem for wireless communication between the trailer control application and the control unit.

A cart 704 is located inside a hut 705 that includes storing places for cuts on (trailer) body 102. In this example hut 705 has a roof plate, a front plate 706, pair of doors for loading trailer 700, and a tarp 707 on the both sides of hut 705. An upper edge of tarp 707 is attached with rollers to a curtail rail 708, one side edge of tarp 707 is permanently attached to front plate 706, and the opposite side of tarp 707 is attached with (three) rubber bands 709 to hut 705.

FIG. 7A shows trailer 700 decoupled from a road vehicle and parked at a delivery site. In more detail, The control unit has received OFF signal from coupling switch 701 when trailer 700 detached from the road vehicle and after that the control unit has waited a predetermined time period (for example, ten seconds) and then trailer 700 is positioned by using the trailer leg such that the trailer pole is parallel with the ground.

FIG. 7B shows the movable locker system in use. In other words, trailer 700 is parked and customers can collect their parcels from it. Rear jacks 711 are useful, especially when loading trailer 700. Rear jacks 711 and the trailer leg operate as legs 118 on which trailer 700 rests when parked.

In FIG. 7B the road vehicle driver has set rear jacks 711 against the ground and locked them. The road vehicle driver has also drawn tarp 707 against front plate 706 to uncover closures 109, 110. A locker door is a typical example of an openable closure. When a customer has input via a user interface 712 a correct access code for a locker, the locker door opens. The movable locker system comprises lockers, a delivery time window for parcels to be delivered, and a cart inside but 705 such that that the cut includes at least some of the lockers.

Hut 705 comprises a lower edge 713 and a vertical edge 714 such that lower edge 713, vertical edge 714, and curtail rail 708 are located at the same distance from a plane defined by the closures (the distance is, for example, 5-10 cm). Hut 705 further comprises an L list such that the L last covers a gap between the upper edge of tarp 707 and curtail rail 708. The L list and tarp 707, and the other structures of hut 705 can protect (without gaps) the movable locker system from rain, snow, ice, dust, and dirt when tarp 707 covers the closures (as shown in FIG. 7A). The movable locker system can be used so that a taxi or some other car transports trailer 700 to a postal sortation hub to be filled there and the same taxi or car then returns trailer 700 to the delivery site.

FIG. 8 shows various embodiments for trailers. In the previous examples the trailer wheels are placed in the middle of the body and carts are used for moving totes into the trailers. There are, however, other options that ae discussed in views 301-805.

In the first view 801 (trailer) wheels 103 are placed in the corners of (trailer) body 102. A benefit is that legs are not needed and the operation is faster at a picking site and a delivery site (compared to use of legs 118).

In the first view 801 (hailer) wheels 103 are placed in the corners of body 102. A benefit is that trailer legs are not needed and the operation is faster at a picking site and a delivery site (compared to use of legs 118).

In the second view 802 (trailer) wheels 103 are placed on the other end of body 102, in the proximity of pair of doors 603. Attachment point 101 is a type of attachment point used in semi-trailers. A benefit of this embodiment is that the road vehicle can be attached fast to trailer 600 and detached fast from it. The driver does not necessarily need to leave the cockpit for the attachment and detachment of trailer 600.

The third view 803 shows a frame 806. In this context a cart means a device whose wheels carry the whole mass of cart, and the frame means a device whose mass is at least partly carried by a vehicle, such as a forklift. Frame 806 includes wheels or rollers 807 on its one end and legs 808 on its opposite end. A dolly, which is equipped with rollers, can be guided under frame 806 to lift legs 808 up. Then frame 806 can be moved by the dolly into a trunk, for example, into the trunk of trailer 600 in the second view 802.

The fourth view 804 shows a trailer 800 whose length is almost ten meters. Attachment point 101 is a type of attachment point used in semi-trailers and it is connected to a beam 809. Beam 809 and its support 810 are attached to the front wall 613 of trailer 800 so that attachment point 101 is located at least 80 cm from the ground. Then a road vehicle can be reversed under attachment point 101 for moving trailer 800.

The fifth view 805 shows trailer 800 from a bird's perspective. Each repository of trailer 800 is a locker that can receive two boxes of size 60×40×35 cm so that the long sides of the boxes touch each other. For example, boxes 811, 812 are placed in a locker 813 operating as repository 107. The long sides of the boxes are parallel with the long side of trailer 800 and the boxes are located in four lines. There are twelve boxes in a line and there are three layers of boxes. Thus, the maximum number of boxes is 144 (carts or frames are not shown). The width of trailer 800 is about 180 cm and it can be parked into two subsequent parking lots.

FIG. 9 shows an automatically closable first closure 109. In the prior art automatons a closure is usually a hinged hatch that opens to the right or to the left. Those hatches have certain drawbacks. A first drawback is that a customer or some other person may hurt himself/herself to the hatch when the hatch is opened. A second drawback is that the prior art hatch cannot be closed by the automaton, if the customer forgets to close the hatch. This drawback especially concerns automatons that are missing lockers. A third drawback is generally the opening and closing of the closures.

For example, trailer 800 in view 805 includes altogether 72 repositories and as many closures. If the closures are manual, they must be opened by hands when a loading of trailer 800 starts and they must be closed by hands when the loading is done, which takes quite much time. The above mentioned drawbacks can be solved by using a small-sized automated roller door as first closure 109. A roller door is used in the prior art, for example, as a door of a car garage.

View 901 shows first closure 109 implemented as a roller door. First closure 109 is in a closed position and it covers first opening 105 into locker 813 (first opening 105 and locker 813 are not visible because they are located behind first closure 109).

View 902 shows a cross-section of first closure 109 from the side. The short sides (40 cm) of boxes 811, 812 are marked with dash lines. First closure 109 comprises four trapezoidal wheels 903-906, a trapezoidal belt 907 surrounding trapezoidal wheels 903-906, roller door lamellas 908 attached to trapezoidal belt 907, an activator 909 coupled to wheel 903, and at least one sensor for providing sensor data about a current position of the closure. Activator 909 is operated on the basis of this sensor data. In addition to wheels 903-906, four corresponding wheels, and a trapezoidal belt surrounding the four corresponding wheels are located on the opposite side of locker 813. Door lamellas 908 are also attached to said trapezoidal belt. Trapezoidal wheels 903-906 and the four corresponding wheels are attached with axels to the inner surface 910 of locker 813. Activator is in view 902 an electric motor which can rotate wheel 903 to open the closure such that roller door lamellas 908 move via wheel 905 towards wheel 906.

An electric motor, pneumatic apparatus, or another type of activator 909 with various, generally known hatch, folding door, sliding door, or roller door implementations can be utilised when designing and implementing an automatically closable closure for trailer 100, 600, 700, or 800.

FIG. 10 shows an arrangement 1000 for picking, storing, transporting, and delivering of grocery products. Arrangement 1000 is operating in at least two sites, at a picking site 1001, where products are picked, and at a delivery site 1002, where the products are delivered to customers.

There are usually a number of delivery sites, but arrangement 1000 comprises in this example only one delivery site and two similar trailers 1003, 1004 which can be transported with a road vehicle between picking site 1001 and delivery site 1002. The both trailers 1003, 1004 may be trailers 100, trailers 600, trailers 700, or trailers 300. Alternatively, they can be of different kinds of trailers.

Trailer 1003 is currently parked on a parking lot 1005 at delivery site 1002 and trailer 1004 is parked at picking site 1001. In one embodiment trailer 1004 is connectable to mains electric power and it operates as a movable cool storage. When the picking stage is running products are picked and moved into trailer 1004.

When the delivery time window of trailer 1003 is closed, or is soon closing, it is time to change a trailer at delivery site 1002. In one embodiment the changing of trailer 1003 includes the following acts. A driver, who has transported trailer 1004 (with the products) to delivery site 1002, parks trailer 1004 on a parking lot 1006. Parking lot 1006 is preferably located beside parking lot 1005. Then the driver detaches trailer 1004, drives the vehicle beside parking lot 1005, and attaches trailer 1003 to the vehicle. Thus, there is usually no need to lift the totes at delivery site 1002 but the driver just replaces the empty trailer (trailer 1003) with trailer 1004. If trailer 1003 is not empty, i.e. at least one customer has not fetched his/hers totes, the driver moves the totes by hands from trailer 1003 into trailer 1004 (this is possible, if trailer 1004 has enough space for the totes).

A benefit of arrangement 1000 is that it is scalable. When adding a trailer or trailers into arrangement 1000 the cool storage capacity is increased and also a delivery capacity is increased. The increment of the delivery capacity can be utilized at delivery site 1002 so that two (or more) trailers are parked there within the same delivery time window. Alternatively, the increment of the delivery capacity can be utilized by adding a new delivery site to arrangement 1000 and using the new trailer/trailers at the new delivery site.

Arrangement 1000 is intended for various grocery products or daily consumer goods. If the products to be delivered include frozen food or another temperature controlled product, the repositories trailers 100, 600, 700, 800 need to maintain a certain temperature, for example, a refrigerator temperature (2-6° C.).

In one embodiment the certain temperature is maintained using air-conditioning and a thermally insulated trunk.

In one embodiment the temperature controlled product(s) is/are placed with a cooler, such as gel ice, into a thermally isolated container. The container must be small enough to fit into at least one repository in trailer 100, 600, 700, 800. The cooler and the container maintain a required refrigerator temperature for the product(s). In one embodiment a customer is expected to leave the cooler, the container, and a possible box in a repository of trailer 100, 600, 700, 800.

In one embodiment trailer 700 enables different controlled temperatures in different repositories. Then it is possible to place frozen food in a repository that maintains a freezer temperature (at least −1° C.).

One objective of the invention is to reduce or eliminate manual work or process stages, such as moving products into a (chilled) storage before moving them into a trunk. Grocery products have a predetermined time period intended for their picking and within the predetermined time period the grocery products to be picked are moved into the trunk of a trailer. One benefit is that a driver does not need to wait that grocery products are loaded in the trunk. The trunk of the trailer is already filled when the driver arrives to the picking site. Another benefit is that traffic jams at the loading platform can be avoided, and the delivery stage is fast, because the trailers are loaded and ready for the transportation.

Process stages and other features described in the above with trailer 100, 600, 700, or 800 also concerns arrangement 1000.

While the invention has been described in connection with exemplary embodiments and implementations the invention further covers various modifications and equivalent arrangements within the following claims.

What is claimed is:

1. A trailer for a delivery of products, the trailer comprising
    an attachment point for attaching the trailer to a road vehicle that is able to tow the trailer from a picking site of the products to a delivery site;
    a body with wheel;
    a wall attached to the body, the wall including openings to a trunk that is limited by at least the body and the wall; and
    closures to cover and disclose the openings; and
    the trailer is configured to open a first closure in response to a correct identifier;
    the trailer is configured to receive plurality of carts each of which has repositories for the products and is manually movable on wheels by one person, including a cart that is movable to a storing place in the trunk
    so that, at the storing place, the cart holds a first repository beside a first opening and a second repository beside a second opening;
    the trailer is configured for the delivery so that the first repository in the trunk is reachable only through the first opening and the second repository in the trunk is reachable only through the second opening;
    the trailer is configured to be detached from the road vehicle for parking the trailer at the delivery site; and
    the trailer is configured to open a first closure in response to a correct identifier, the first closure disclosing the first opening.

2. The trailer of claim 1, wherein the trailer comprises a space for a battery.

3. The trailer of claim 1, wherein the trailer comprises a space for an accumulator and the closures are configured to operate on the battery.

4. The trailer of claim 1, wherein the trailer comprises a cooling apparatus for cooling the trunk.

5. The trailer of claim 1, wherein the trailer comprises a space for a battery and a cooling apparatus for cooling the trunk; and due to the battery the cooling apparatus is independent from mains electric power, at least during transportation from a picking site to a delivery site.

6. The trailer of claim 1, wherein the trailer comprises opposite to the wall a corresponding wall including openings to repositories in the trunk.

7. The trailer of claim 1, wherein the trailer comprises opposite to the wall a corresponding wall including openings to repositories in the trunk; and the trailer and the cart have such measures that the cart extends from the wall to the corresponding wall.

8. The trailer of claim 1, wherein the trailer comprises opposite to the wall a corresponding wall including openings to repositories in the trunk; and the first repository is tilted to keep its content inside of it.

9. The trailer of claim 1, wherein the first closure is implemented as roller door lamellas.

10. The trailer of claim 1, wherein the first closure is movable by an activator to cover the first opening.

11. The trailer of claim 1, wherein the trailer is configured to receive the cart, in which the first repository is located, on a moveable shelf.

\* \* \* \* \*